March 8, 1932. G. B. HAYES ET AL 1,848,421
WATER LEVEL INDICATOR FOR INTERNAL COMBUSTION ENGINES
Filed June 24, 1929
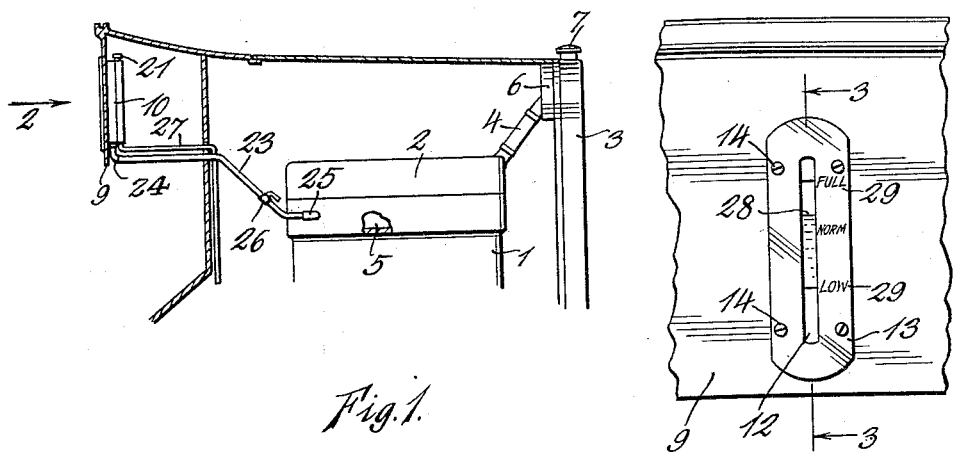
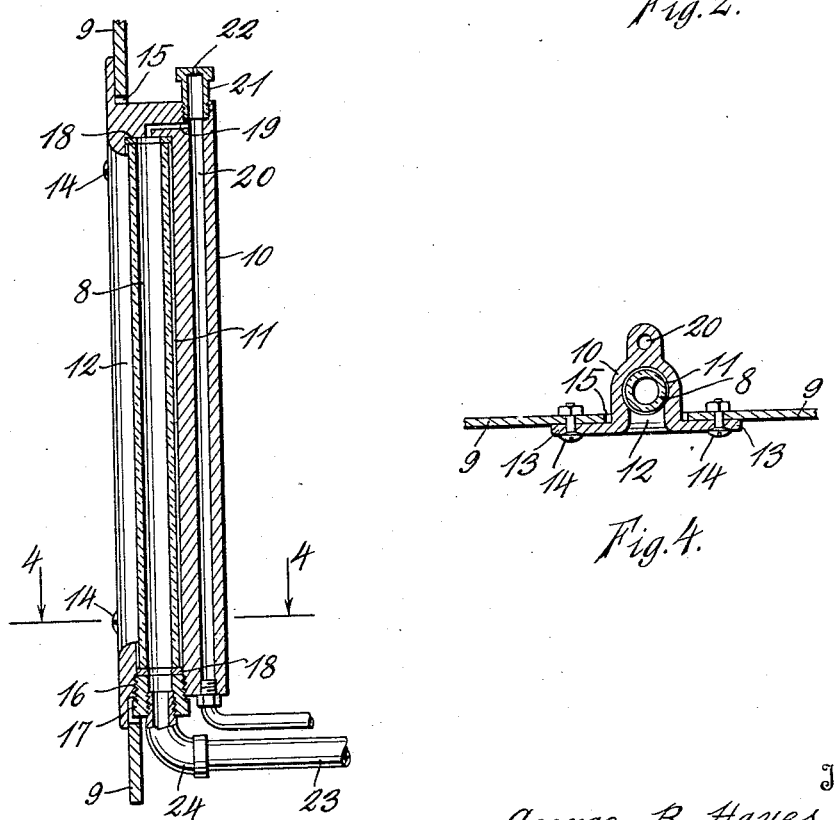

Patented Mar. 8, 1932

1,848,421

UNITED STATES PATENT OFFICE

GEORGE B. HAYES AND DANIEL L. MALLOY, OF DENVER, COLORADO

WATER LEVEL INDICATOR FOR INTERNAL COMBUSTION ENGINES

Application filed June 24, 1929. Serial No. 373,271.

This invention relates to improvements in water level indicators for use with automobiles.

Internal combustion engines of the type employed with automobiles are usually water cooled and for this purpose are provided with a water jacket that is connected with a radiator. The radiator must be kept practically full of water so as to assure a constant circulation of water through the water jacket. It is quite necessary for the driver of an automobile to be advised as to the condition of his water supply, and unless the radiator is provided with some water level indicator, the only way in which the level of the water can be ascertained, is by removing the radiator cap, which necessitates considerable effort and makes it necessary for the driver to descend from the car.

It is the object of this invention to produce a water level indicator that can be located on the instrument board of an automobile, and which will be visible at all times from the driver's seat. By the use of a water level indicator located in the manner pointed out, the driver can always see the condition of his water supply before starting out in the morning and at any time during the day.

One of the objects of this invention is to provide a water level indicator consisting of a gauge glass whose lower end is connected with the water jacket space of the engine and whose upper end is provided with a vent that permits air to enter and leave the upper end of the gauge glass, but which is provided with a choke that restricts to a small amount the escape of water through the choke.

The above and other objects that may become apparent as the description proceeds are attained by means of a construction and an arrangement of parts that will now be described in detail, reference for this purpose being had to the accompanying drawings in which the preferred embodiment of the invention has been illustrated, and in which:

Fig. 1 is a longitudinal vertical section through an engine hood of an automobile showing the improved water level indicator attached to the engine;

Fig. 2 is a view, to a somewhat enlarged scale, looking in the direction of arrow 2, Fig. 1, and shows the appearance of the water level indicator;

Fig. 3 is a section taken on line 3—3, Fig. 2; and

Fig. 4 is a section taken on line 4—4, Fig. 3.

In the drawings reference numeral 1 represents an internal combustion engine having a removable cylinder head 2, and reference numeral 3 indicates the radiator. The radiator is connected with the engine by means of a tubular connection 4 which connects the interior of the radiator with the water jacket that surrounds the engine and which has been designated by reference numeral 5. The radiator is provided with an expansion tank 6 at its top. The water level should be as high as possible and is usually maintained about half way between the top of the radiator and the opening into the connector 4. When the water level falls below the bottom of the expansion tank, there is danger of overheating the engine as the greater portion of the water is that which is contained in the expansion tank and therefore when the expansion tank is empty, there is not sufficient water for efficient cooling.

In order to make it possible for the driver to see the level of the water without removing the radiator cap 7, a gauge glass 8 has been arranged in an opening in the instrument board 9. The gauge glass is secured in a holder which is preferably formed from brass that is cast into the desired shape. This holder has a body portion 10 of a length somewhat greater than the maximum of water level variation that is permissible and may be approximately six inches in length. Member 10 has an opening 11 of sufficient size to receive the gauge glass 8 and is provided on one side with a slot 12 through which the gauge glass may be seen. Member 10 is also provided with laterally extending flanges 13 that are perforated for the reception of bolts 14 by means of which the assembly is secured to the instrument board 9. The instrument board is provided with a slot 15 of such width that the member 10 can be inserted therein in the manner shown. The lower end of opening 11 is threaded as indicated by numeral 16 and a threaded nipple 17 cooperates with the threaded section 16 for holding the gauge glass in place. The upper end of the gauge glass is separated from the upper end of opening 11 by means of a washer 18 while another washer separates the end of the nipple 17 from the lower end of the glass gauge and when the nipple is tightened, it forms a seal between the ends of the gauge and the holder. The upper end of member 10 is provided with a small opening 19 that connects the interior of the gauge glass with the overflow or drain opening 20. Opening 19 should be made very small so as to serve as a choke which will permit air to enter and leave the gauge glass but which will restrict the flow of water and thus limit the amount of water that can escape to a negligible quantity. The upper end of opening 20 is threaded for the reception of the threaded end of a hollow plug 21. The upper end of plug 21 has a vent 22. A pipe 23 is connected with the interior of the bushing 17 by means of a suitable fitting such, for example, as the L 24 that is shown in the drawings. Pipe 23 extends through the dashboard and is connected with the water jacket space by means of an L 25. A stop cock 26 is provided in pipe 23 for the purpose of closing the opening through this pipe if occasion should ever require. A small flexible copper tube 27 is connected with the lower end of the drain opening 20 and extends through an opening in the dash and thence downwardly a short distance. It is evident that opening 20 does not necessarily have to extend all the way to the bottom of the gauge as shown in the drawing, but can terminate any distance below the choke 19 but in either case tube 27 is connected with its lower end as shown.

With the parts constructed in the manner shown and connected with the engine in the manner illustrated in Fig. 1, we will assume that the radiator is filled with water until the level of the water reaches the line indicated by reference numeral 28 in Fig. 2. The indicator is provided with indicia such as those designated by reference numeral 29 that are associated with lines indicating the full and low level limits of the water. In the event that the water should boil furiously and develop a pressure, it is evident that the pressure of the steam produced would force the water to the top of the water glass, but since the opening 19 is made very small, only a negligible amount of water would escape in this manner. The vent 22 is provided for the purpose of preventing the formation of a siphon which might otherwise drain the water from the engine and radiator.

One of the main problems to be solved in the construction of a water gauge of this kind is to prevent the water from squirting out of the vent into the car body when the machine is started and when it is stopped suddenly so as to cause the water to surge back and forth in the cooling system. The principal object of the vent 22 is to permit atmospheric pressure to prevail on top of the water in the gauge glass so that the true level of the water in the cooling system will be indicated. The choke opening 19 is to prevent the water from squirting through the vent 22 when the speed of the car it altered suddenly. The vent also prevents the formation of a syphon as above explained while another function of the choke opening is to restrict or limit the loss of water. If the choke opening 19 were used alone without the vent 22 a syphon would readily form and if the vent opening 22 communicated directly with the gauge glass, water would squirt out and therefore the two are essential. The vent must be separated from the gauge by a restricted opening 19 in order to obtain the results desired.

In the above description and on the drawing a specific embodiment of this invention has been disclosed, but it is evident that the indicator can be constructed in many different ways and therefore the embodiment shown and described is to be considered as illustrative of the construction and not as limiting the invention to any greater extent than made necessary by the state of the prior art.

From the above description it will be apparent that this invention is of such construction that it can be readily applied to any existing automobile and that it can also be used as standard equipment and applied in the factory.

Although the invention has been described as useful more particularly with automobiles, it is evident that it can also be employed with any combustion engine employing a radiator in combination with the cooling system.

Having described the invention what is claimed as new is:

1. A water level indicator for internal combustion engines, comprising, in combination, an elongated body member having an opening extending inwardly from one end thereof, one end of said opening being closed and the other end having a threaded section, an opening of small cross section communicating with the first mentioned opening and extending to the surface of said member and which forms a choke and an opening venting said second mentioned opening to the atmosphere, a gauge glass located in the first mentioned opening, said glass being shorter than the first mentioned opening, a tubular nipple threadedly connected with the threaded section of the first mentioned opening, packing material located between one end of the gauge glass and the closed end of the first mentioned opening, packing material located between the other end of the gauge glass and the end of the nipple, a supply pipe connected at one end to the nipple, and an overflow pipe connected with the body member and in communication with the interior of the gauge glass through said opening of small cross section and in communication with the atmosphere through said vent opening which prevents the formation of a siphon.

2. A water level indicator for internal combustion engines having a water jacket comprising an elongated upright body member having an opening extending inwardly from one end thereof and a slot in the wall of the opening, the slot extending a part way only of the opening, a tubular gauge glass in the opening, means for holding the glass in the opening and for forming a seal between the ends of the tube and the ends of the opening, the upper end of the body member having a small opening that communicates with the interior of the gauge glass, an overflow pipe in communication with the small opening, said member having a vent for connecting the small opening with the atmosphere whereby a siphon action is prevented, and a tubular member extending from the lower end of the gauge glass to the interior of the water jacket of the engine.

3. A water level indicator comprising, in combination, an elongated upright body member having an opening extending inwardly from its lower end, the upper end of the opening being closed, a gauge glass in the opening, means for connecting the lower end of the gauge glass to a liquid container, the closed upper end of the elongated member having a restricted opening in communication with the opening in which the gauge glass is located and which forms a choke, an overflow pipe, the restricted opening having one end in communication with the overflow pipe, the body member having a vent opening that communicates with the restricted opening where it joins the overflow pipe, whereby the choke is located between the vent and the upper end of the gauge glass.

4. A water level indicator adapted to indicate the level of water in the container of a cooling system operating under atmospheric pressure and subjected to violent periodic disturbances or surges, comprising a gauge glass whose lower end is located below the lower limit of the water level, a conduit connecting the lower end of the gauge glass with the container, the upper end of the gauge glass extending above the upper limit of the water level, an overflow pipe in communication with the upper end of the gauge glass through a restricted opening which forms a choke, there being a vent opening at the point where the restricted choke opening communicates with the overflow pipe.

In testimony whereof we affix our signatures.

GEORGE B. HAYES.
DANIEL L. MALLOY.